US006510591B1

(12) United States Patent
Atkinson et al.

(10) Patent No.: US 6,510,591 B1
(45) Date of Patent: Jan. 28, 2003

(54) INTERMEDIATE SUPPORT FOR ELONGATE SAFETY LINE OR RAIL

(75) Inventors: Geoffrey Fraser Atkinson, Wiltshire (GB); Timothy George Bissett, Devizes (GB)

(73) Assignee: Latchways PLC., Wiltshire (GB)

( * ) Notice: Subject to any disclaimer, the term of this patent is extended or adjusted under 35 U.S.C. 154(b) by 0 days.

(21) Appl. No.: 09/719,496

(22) PCT Filed: Jun. 18, 1999

(86) PCT No.: PCT/GB99/01883

§ 371 (c)(1), (2), (4) Date: Mar. 9, 2001

(87) PCT Pub. No.: WO99/66245

PCT Pub. Date: Dec. 23, 1999

(30) Foreign Application Priority Data

Jun. 19, 1998 (GB) ............................................ 9813353

(51) Int. Cl.$^{7}$ ............................................ F16G 11/00
(52) U.S. Cl. ...................................... 24/129 R; 248/61
(58) Field of Search .............................. 24/129 R, 130, 24/129 B, 339, 336; 248/74.1, 61, 62, 65, 63

(56) References Cited

U.S. PATENT DOCUMENTS 817,557 A * 4/1906 Hatherly et al. ............ 174/135
862,082 A * 7/1907 Lewis ...................... 24/129 B
2,058,752 A 10/1936 Wray
2,356,908 A * 8/1944 Arrowsmith .............. 24/129 R
2,452,175 A * 10/1948 Atkins ...................... 24/129 R
2,508,076 A * 5/1950 Palmer ..................... 24/129 B
2,858,590 A * 11/1958 Koch ......................... 174/135
3,749,820 A * 7/1973 Langlie et al. ........... 174/163 F
4,011,638 A * 3/1977 Holt et al. .................. 403/171
4,182,013 A 1/1980 Grossman
5,524,327 A 6/1996 Mickel et al.
5,524,883 A * 6/1996 Allen et al. ................ 24/115 F

FOREIGN PATENT DOCUMENTS

FR 2397582 2/1979
GB 938881 10/1963

* cited by examiner

*Primary Examiner*—James R. Brittain
(74) *Attorney, Agent, or Firm*—Tarolli, Sindheim, Covell, Tummino & Szabo L.L.P.

(57) ABSTRACT

A support for an elongate element comprises a body portion adapted to restrain a supported elongate element against lateral movement. The body portion has a plurality of partial shells extending therefrom, each partial shell having a cross section substantially conforming to a part of the profile of the elongate element to be supported. Adjacent partial shells extend in opposing lateral directions relative to the longitudinal axis of the support. The support may be a split cylinder having a helical groove extending longitudinally of the support, the width of the groove 16 being at least equal to the diameter of the elongate element to be supported.

3 Claims, 2 Drawing Sheets

INTERMEDIATE SUPPORT FOR ELONGATE SAFETY LINE OR RAIL

The present invention relates to height safety equipment and, in particular, to an intermediate support bracket for an elongate safety line, such as a wire rope or cable, a solid rod or a rail element. Most especially, the invention relates to an intermediate support bracket which is capable of being fitted retrospectively to an existing installation without interruption of the running surface of the safety line, and to a bracket which can be used during installation of a temporary height safety system.

The invention also has applicability in load transfer systems in which loads are suspended from an overhead guide such as a cable, rod or track which requires intermediate supports.

In a permanent installation, the positioning of intermediate brackets to support the elongate safety element can be planned in advance. Usually, bracket spacing will be determined such that long, unsupported spans are avoided. However, it is sometimes the case that a meticulously planned permanent installation requires modification after assembly, for example to compensate for unforeseen wind buffeting in a localised vortex. Temporary installations present a different problem in that the requirements for intermediate supports may not become apparent until the terminal anchors have been fixed.

In the circumstances described above, there is a need to provide retrospective intermediate supports in order to ensure that the elongate safety line is held against lateral movement out of its operating plane, to guarantee safe operation.

It is therefore an object of the present invention to provide an intermediate support for an elongate element such as a personnel safety line or rail, or a load transfer guide element, which is capable of both retrospective fitting and removal without needing to break the element for the fitting or removal thereof.

The invention is an elongate element support comprising a body portion adapted to restrain a supported elongate element against lateral movement, said body portion having a plurality of partial shells extending therefrom, each partial shell having a cross-section substantially conforming to a part of the profile of the elongate element to be supported, characterised in that adjacent partial shells extend in opposing lateral directions relative to the longitudinal axis of the support.

In its simplest form, the support may comprise only two partial shells.

In a preferred embodiment of this two-shell variant, the shells are separated by an amount at least equal to the diameter or maximum cross-sectional dimension of the element to be supported. This enables the support to be offered to the elongate element in an orientation at right angles to its working orientation, then twisted through 90°, so that the opposing partial shells engage the elongate element and restrain it against lateral movement. A bracket arm extending from the support can be used to attach the support to a fixed structure in its working orientation.

In another variant, there are three partial shells in total, the central partial shell extending in the opposite lateral sense to the end partial shells. The three-shell variant may be a split cylinder having a helical groove extending longitudinally of the support. The width of the groove will be at least equal to the diameter of the elongate element to be supported.

Embodiments of the invention having more than two partial shells are best suited to elongate elements with a circular or near-circular cross-section. Embodiments of the invention having more than three partial shells are only of practical utility if the elongate element has a degree of inherent lateral flexibility. Persons skilled in the art will appreciate that too much flexibility in the elongate element will probably render it unsuitable for height safety applications. It is thought that, for the majority of applications, two- and threeshell embodiments of the invention will be used.

The invention will now be described by way of example only with reference to the drawings, in which.

Figure 1:
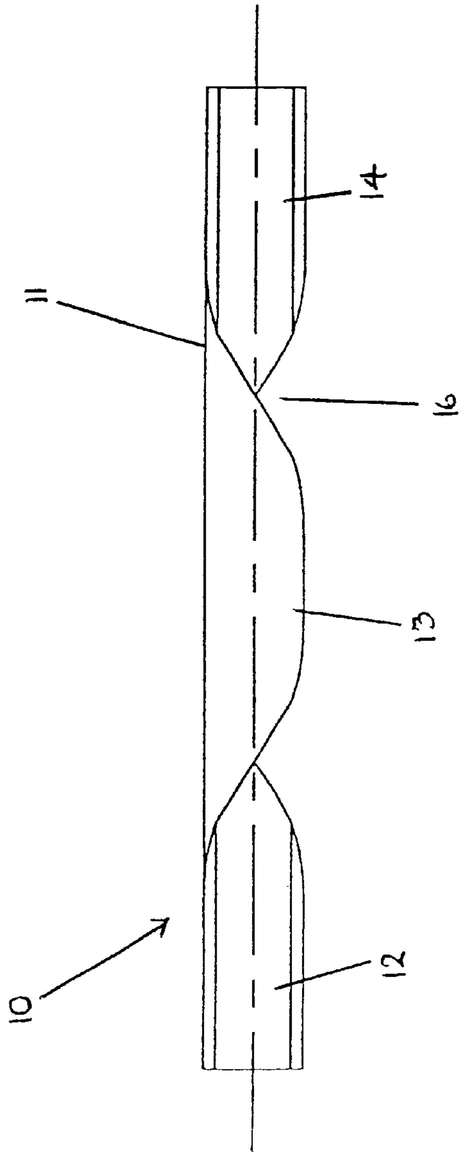
FIG. 1 is a front elevation of a support according to the present invention.

Referring now to FIG. 1, this view shows a support 10 for an elongate safety element such as a multi-strand metal cable (not shown). The support comprises a body member 11 having three partial shells 12, 13, 14 extending therefrom. In the orientation of the device as shown with reference to the plane of the drawing, the centre partial shell 13 extends from the top of the support, out of the plane of the page and returns towards the plane of the page at the bottom of the device. By contrast, the two end partial shells 12, 14 extend from the top of the support, behind the plane of the page and return towards the plane of the page at the bottom of the device.

Figure 2:
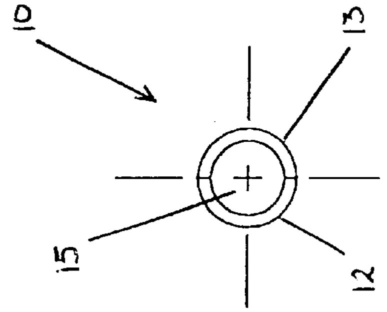
FIG. 2 is an end view of the support shown in FIG. 1.

When viewed end-on (FIG. 2), the support appears to be cylindrical, with a bore 15 dimensioned to receive the elongate element to be supported.

The partial shells 12, 13, 14 are separated from each other by a longitudinal groove 16 which executes a helical path from one end of the support to the other. The width of the groove 16 is selected to be at least equal to the diameter of the elongate element to be supported, otherwise it will not be possible to fit the support to the element by relative lateral movement.

Figure 3:
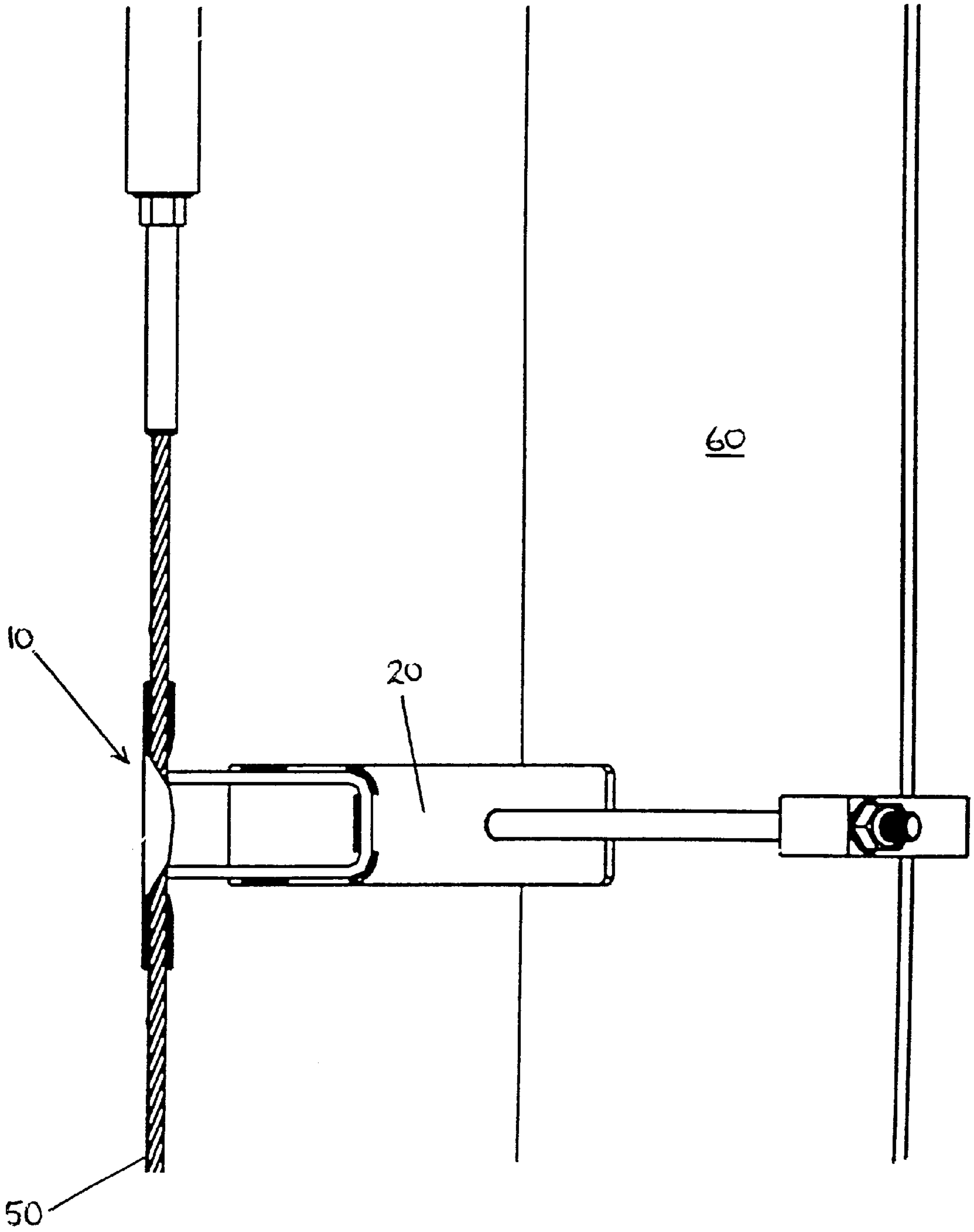
FIG. 3 is a side view of the support shown in FIGS. 1 and 2 showing the device installed on an elongate safety cable.

FIG. 3 shows a side view of a support 10 installed on an elongate element in the form of a multi-strand metal safety cable 50. Also visible in this view is the associated fixing bracket 20 designed to fasten the support 10 to part of a fixed structure 60. The bracket 20 can be designed in various configurations to suit particular circumstances or situations, and the precise geometry of the bracket does not form part of the present invention.

Although the invention has been particularly described above with reference to a specific embodiment, it will be understood by persons skilled in the art that these are merely illustrative and that variations are possible without departing from the scope of the invention.

What is claimed is:

1. An elongate element support comprising a body portion adapted to restrain a supported elongate element against lateral movement, said body portion being a split cylinder having a helical groove extending longitudinally of the body portion, said body portion having three partial shells extending therefrom, each partial shell having a cross-section substantially conforming to a part of the profile of the elongate element to be supported, and wherein adjacent partial shells extend in opposed circumferential directions about a longitudinal axis of the body portion, the width of the groove being at least equal to the diameter of the elongate element to be supported.

2. The elongate element support according to claim 1 wherein said partial shells extend linearly along a common linear axis.

3. The elongate element support according to claim 1 wherein a supported elongate element is restrained against lateral movement by attaching a supported elongate element via said elongate element support to a fixed structure spaced from a supported elongate element.

* * * * *